United States Patent [19]

Leslie

[11] 4,198,880

[45] Apr. 22, 1980

[54] ROTOR DRIVE FOR PULSATO APPARATUS

[76] Inventor: Donald J. Leslie, 1561 Gaywood Dr., Altadena, Calif. 91001

[21] Appl. No.: 944,419

[22] Filed: Sep. 21, 1978

[51] Int. Cl.² ............................................. F16H 37/06
[52] U.S. Cl. ...................................... 74/661; 74/190.5; 74/847; 74/849; 84/1.24; 84/DIG. 4
[58] Field of Search ............... 310/191, 209, 112, 118, 310/120, 122; 318/67, 102, 103, 40, 159; 84/1.24, DIG. 4; 74/190, 190.5, 661, 847, 849

[56] References Cited

U.S. PATENT DOCUMENTS

| | | | |
|---|---|---|---|
| 2,485,848 | 10/1949 | Sharp | 310/122 |
| 2,869,669 | 1/1959 | Leslie | 84/DIG. 4 |
| 3,146,291 | 8/1964 | Leslie | 84/DIG. 4 |
| 3,163,791 | 12/1964 | Carlson | 310/209 |
| 3,174,065 | 3/1965 | Jaun | 310/112 |
| 3,245,284 | 4/1966 | Leslie | 74/661 |
| 3,372,225 | 3/1968 | Leslie | 84/1.24 |
| 3,886,835 | 6/1975 | Peterson | 84/DIG. 4 |

*Primary Examiner*—J. V. Truhe
*Assistant Examiner*—Forester W. Isen
*Attorney, Agent, or Firm*—Flam & Flam

[57] ABSTRACT

A two-speed motor drive system for an acoustic rotor includes two simple, relatively inexpensive motors cooperatively arranged to drive the acoustic rotor at either a pulsato speed or a slower chorus speed, and also to provide automatic braking of the rotor from full pulsato speed to either slow chorus speed or to a fully stopped condition.

11 Claims, 7 Drawing Figures

ROTOR DRIVE FOR PULSATO APPARATUS

BACKGROUND OF THE INVENTION

This invention relates to musical instruments, particularly electronic organs, and especially to apparatus for producing pulsato by acoustic devices. An example of such apparatus is shown and described in U.S. Pat. No. 3,245,284 dated Apr. 12, 1966, issued to Donald J. Leslie.

During the course of a musical composition, the organist often desires to change the type of pulsato to be added. For example, he may wish to select acoustic pulsato, electronic pulsato or no pulsato. The selection is customarily made by operating organ stops or switches. In some applications, the switches merely shift the electrical signal from rotary pulsato apparatus to a non-rotary speaker. Alternatively, the acoustic pulsato apparatus, which includes moving parts such as rotors, may be stopped and started by the operation of switches. When acoustic pulsato is not desired, it may yet be desired slowly to shift the sound source at a rate well below pulsato frequencies, for example, at about two-thirds of a cycle per second in order to produce what has come to be defined as "chorus." A system for achieving the latter effect is described in the aforementioned U.S. Pat. No. 3,245,284 and includes two motors cooperatively arranged to drive a pulsato rotor either at full pulsato speed, or at a much slower rate to produce chorus.

In the patented system, the main motor for driving the rotor at full pulsato speed is arranged so that it is always coupled to the rotor by a pulley arrangement operated from one end of the motor shaft.

A secondary motor has an axially floating rotor that is spring biased normally to be out of alignment with its stator. When the secondary motor is energized, the floating rotor pulls into alignment by solenoid action. This movement is utilized to provide a releasable friction coupling between the shaft of the secondary motor and a friction wheel carried at the remote end of the main motor. With the secondary motor energized and the main motor de-energized, the acoustic rotor is thus driven at a slower chorus rate. While the patented arrangement produces satisfactory results and has enjoyed a long period of commerical acceptance, it has the disadvantage that when the main drive motor is turned off following operation at full pulsato speed, the pulsato apparatus coasts to a stop without any braking effect; the resulting rather long coasting period results in certain undesirable droning sounds. The patent teaches that this difficulty can be overcome by utilizing a time delay device to cause the slow speed secondary motor to be energized for a period of a few seconds during which its shaft is displaced so as to engage and drive the main motor at slow speed, after which the time delay circuitry shuts off the slow drive motor, whereupon the pulsato rotor comes to a halt. While this system produces satisfactory results, it does utilize relatively complicated time delay circuitry and switching equipment which, in the interest of reducing the cost of manufacture and the risk of failure, is desirably eliminated.

It is the primary object of the present invention to provide by mechanical means alone, that is, without the requirement of electrical delay devices, an inexpensive motor drive system for driving a pulsato rotor at either pulsato speed or slow chorus speed, which also provides automatic braking from full pulsato speed to either slow speed or to a completely stopped condition.

SUMMARY OF THE INVENTION

In order to accomplish the foregoing object, I utilize mechanical interaction of two small motors not only to provide alternative speed modes, but also to brake the pulsato rotor, either to a stop or to a lower chorus speed. The main motor has a floating rotor that, upon energization, moves by solenoid action into transverse alignment with its stator. One end of the main motor shaft carries a driving pulley that is belt coupled to the pulsato rotor. The other end of the main motor shaft carries a clutch-brake element in the form of a friction ring or wheel that runs free when the main motor is energized; however, when the main motor is de-energized, the friction wheel wedges against the shaft of a secondary motor, positioned for such engagement. When the main motor is de-energized, and the secondary motor is also off, the pulsato rotor is braked to a rapid stop by virtue of a skew relationship between the friction wheel and the shaft of the secondary motor, the friction wheel acting as a brake element. The skew relationship results in an inclined or helical line of contact between the friction wheel and the shaft, tending to cause a relative axial advancement of the parts and a consequent axial pull due to the limited axial advancement permitted. The engaging parts accordingly bind, stopping the main motor. Inertia of the pulsato rotor may cause slippage of the belt with consequent friction and braking.

Instead of braking the pulsato rotor to a complete stop, it may be braked to the reduced chorus speed determined by rotation of the second motor. Thus, when the main motor is de-energized while the secondary motor is running, the pulsato rotor is quickly braked by action similar to that described, but the running second motor reverses and binding quickly begins to drive the acoustic rotor at a slow chorus rate. In this instance, the friction wheel ultimately acts as a clutch element. When the second motor is de-energized, braking is quickly accomplished.

In a second form of the invention, a brake disc carried by the shaft of the second motor provides an increased braking surface. The brake disc is retracted by solenoid action of the second motor. The axial shift of the second motor does not disrupt the engagement of the second motor shift with the friction wheel of the main motor.

BRIEF DESCRIPTION OF THE DRAWINGS

A detailed description of the invention will be made with reference to the accompanying drawings wherein like numerals designate corresponding parts in the several figures. These drawings, unless described as diagrammatic, or unless otherwise indicated, are to scale.

DETAILED DESCRIPTION OF PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

Structural and operational characteristics attributed to forms of the invention first described shall also be attributed to forms later described, unless such characteristics are obviously inapplicable or unless specific exception is made.

Figure 1:
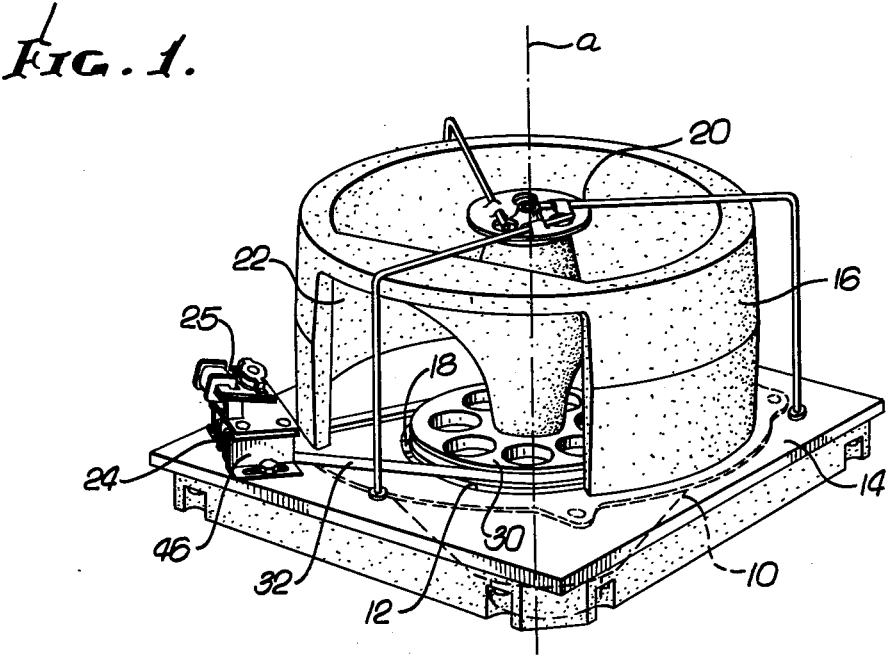
FIG. 1 is a pictorial view of a pulsato unit incorporating the present invention.

In FIG. 1 there is illustrated speaker 10 mounted at one side of an opening 12 in a panel 14. The sound radiation pattern produced by the speaker is rotated about the axis of the speaker by the aid of a pulsato rotor 16 located on the other side of the panel opening. Thus, the rotor 16 is supported for rotation about the common axis a by the aid of two bearing bracket structures, one inboard bracket structure 18 extending across the panel opening 12 and the other outboard bracket structure 20 extending around rotor 16.

The rotor 16 has a curved or angled sound channel 22, the throat end of which continuously communicates with the speaker 10 at the axis of the device and the mouth end of which is located at the periphery of the rotor for orbital movement. When the rotor 16 is rotated at about 5 to 8 cycles per second, a characteristic pulsato is imparted to the sounds. When the rotor is operated at a much slower speed, say one-half to one cycle per second, desirable phase shifts are imparted to the issuing sounds to provide chorus.

Figure 2:
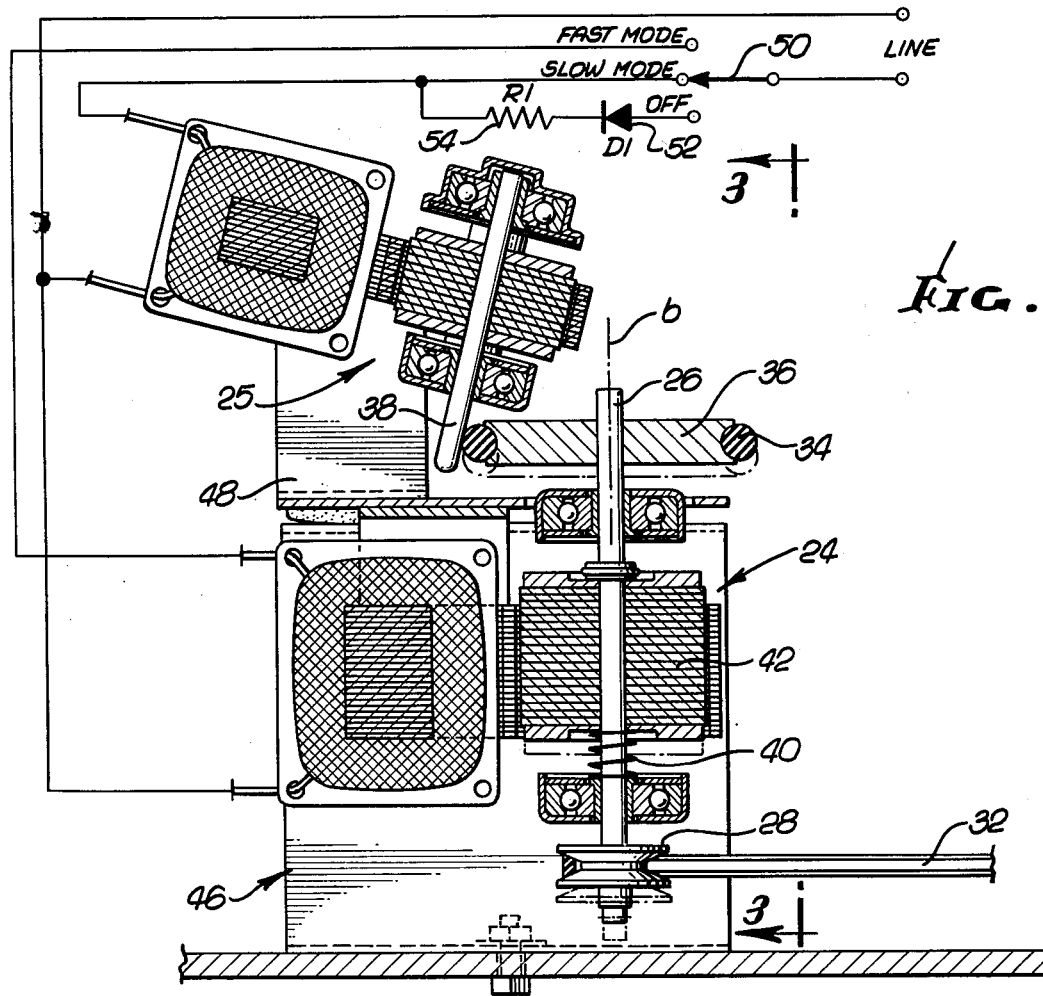
FIG. 2 is an enlarged view of the dual motor assembly with each motor being shown in axial section, the section planes being inclined to each other but shown as if parallel or coincident for purposes of description only. Associated circuitry is diagrammatically illustrated.

In order to operate the rotor at pulsato or chorus speeds, two motors 24 and 25 are provided. Both motors may be of the synchronous shaded pole types. The main motor 24 (FIG. 2) has an extended shaft 26 one end of which is coupled to the pulsato rotor by the aid of pulleys 28 (FIG. 2) and 30 (FIG. 1) and a pulley belt 32. In order to brake the pulsato rotor as well as to operate the pulsato rotor at a reduced chorus rate, the other extended end of the motor shaft 26 carries an annular friction member 34 (FIG. 2) that serves both as a brake element and as a clutch element respectively for braking pulsato rotor or for driving it at a reduced speed. The friction member 34 is preferably a resilient rubber-like tire or ring of circular cross section, tightly fitted in a peripheral groove of a mounting disc 36 attached to the motor shaft 26.

The friction member 34 runs free when the main motor 24 is operated. However, when the motor 24 is de-energized, the friction member 34 retracts axially to engage a snubbing member 38. The retracted position of the shaft 26 is shown in full lines in FIG. 2. Such a retractive movement of the friction member 34 and its shaft 26 is achieved by a spring 40 coiled about the shaft. The spring moves the rotor 42 out of transverse alignment with the stator as shown in full lines. The spring 40 and the shaft 26 are advanced to the dotted line by solenoid or magnetic action when the main motor 24 is energized. The slight axial movement of the pulley 28 has no effect upon the operation of the pulley belt 32.

Figure 3:
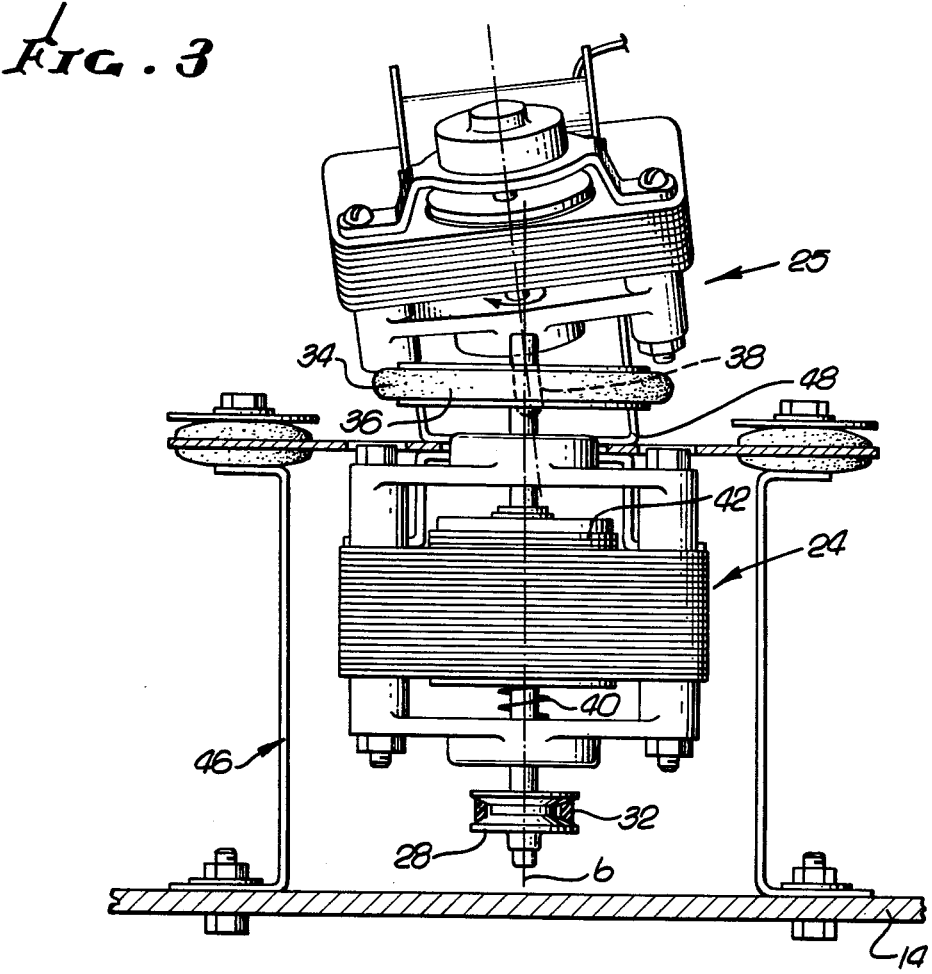
FIG. 3 is a side sectioned view taken along a plane corresponding to line 3—3 of FIG. 2, and showing the motors in side elevation.

The snubbing member 38 is one extended end of the shaft of the supplemental motor 25. The end of the shaft 38 is angled so that part of it is located radially beyond the friction member 34 and so that part of it is located radially inwardly whereby wedging engagement results as the friction member 34 retracts under the influence of the spring 40. As shown in FIG. 3, the shaft 38 is actually slightly inclined to the plane passing through the motor axis b that includes the point of contact. By virtue of this skew relationship, the friction member 34 contacts the shaft 38 along a line that slants helically. As the friction member 34 overruns the shaft 38 for braking, the helical pitch tends to cause the friction member 34 to climb upwardly along the shaft. Since the bearings limit movement, an axial thrust and a binding action results. A significant braking force results.

If the supplemental motor is de-energized, the main motor 24, the friction member 34 and the pulsato rotor rapidly come to a stop by the braking action above described. The pulley drive belt 32 may slip under the influence of the pulsato rotor inertia. Quick dissipation of rotational energy and a quick stop are achieved.

However, if the secondary motor is running, and the main motor is de-energized, the friction member 34 simply brakes the system to the speed of the shaft 38 whereupon operation of the pulsato rotor at chorus rate results. Rotation of the shaft 38 operates in an unwinding direction to release any binding that might occur. A normal friction contact for a driving relationship is rapidly achieved.

The angularity of the shaft 38 makes it possible to mount the motors without critical tolerances. A bracket structure 46 mounts both motors on the panel 14. An oblique bracket part 48 (FIG. 3) for the supplemental motor 25 achieves the desired relative orientation of the motors.

A selector switch 50 (FIG. 2) determines the three modes of operation. In one position, a circuit is established to the main motor 24. In a second position, a circuit is established to the supplemental rotor 26 while the circuit to the main motor is interupted. In a third off position, a small direct current is applied to the supplemental motor to restrain the shaft 38 by a plugging effect. For this purpose, a rectifying diode 52 and a current limiting resistor 54 are provided that are serially inserted in the circuit to the supplemental motor.

DESCRIPTION OF ALTERNATIVE CIRCUITS

Figure 4:
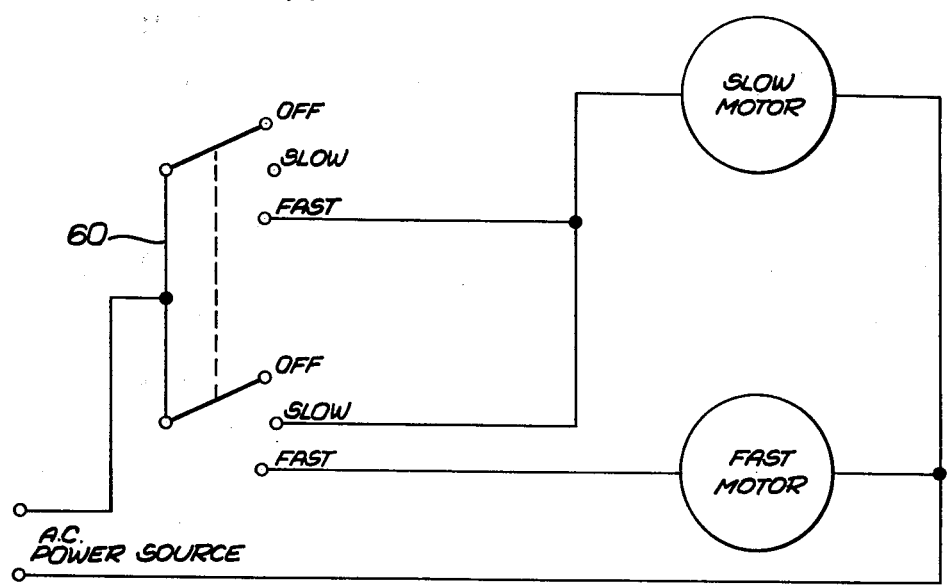
FIG. 4 is a wiring diagram of a modified control circuit for selective operation of the motors.

Optionally, the off position may simply open circuit both motors as indicated by the diagram of FIG. 4. This circuit includes a double pole selector switch 60 wherein the supplemental motor is also operated in the fast position. The supplemental motor provides starting torque and also releases residual binding due to the helical arrangement. In a short time, solenoid action entirely frees the friction member 34.

Figure 5:
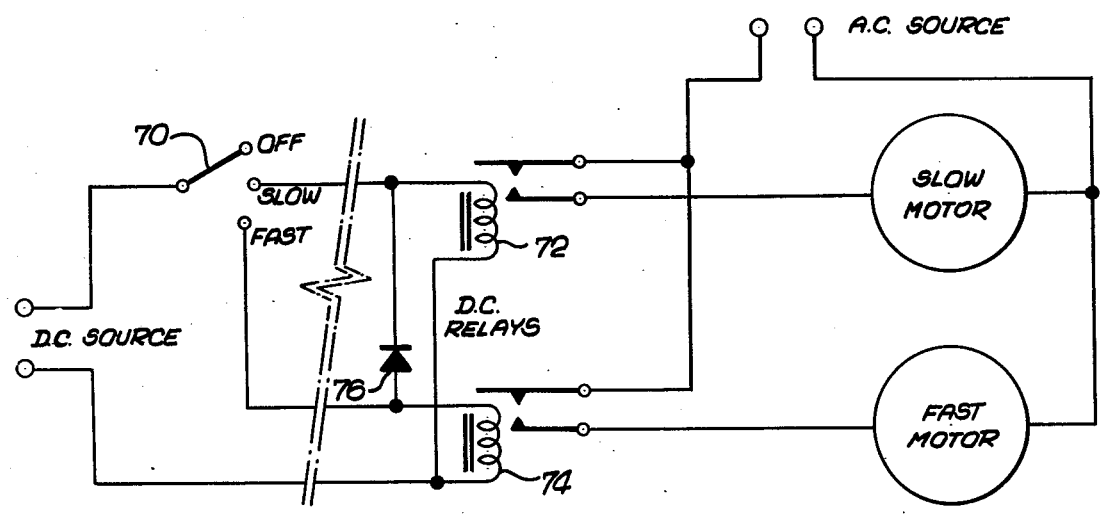
FIG. 5 is a wiring diagram of a remote control circuit for selective operation of the motors.

A wiring system suitable for remote control is illustrated in FIG. 5. Low voltage d.c. lines may be run between the pulsato equipment to a remote location. At the remote location, only a three position selector switch 70 is provided. In the slow position, a d.c. relay 72 is energized to close a power circuit to the supplemental motor. In the fast position, a relay 74 closes a power circuit for the main motor. When the main motor relay 74 is energized the supplemental motor relay 72 is also energized, but not vice-versa. A starting torque assist is thus provided. For this purpose, a unidirectionally conductive rectifying diode 76 extends between slow and fast contacts of the selector switch 72. Accordingly, in the fast position, the supplemental motor assists in the manner previously described.

DESCRIPTION OF FIRST ALTERNATIVE FORM

Figure 6:
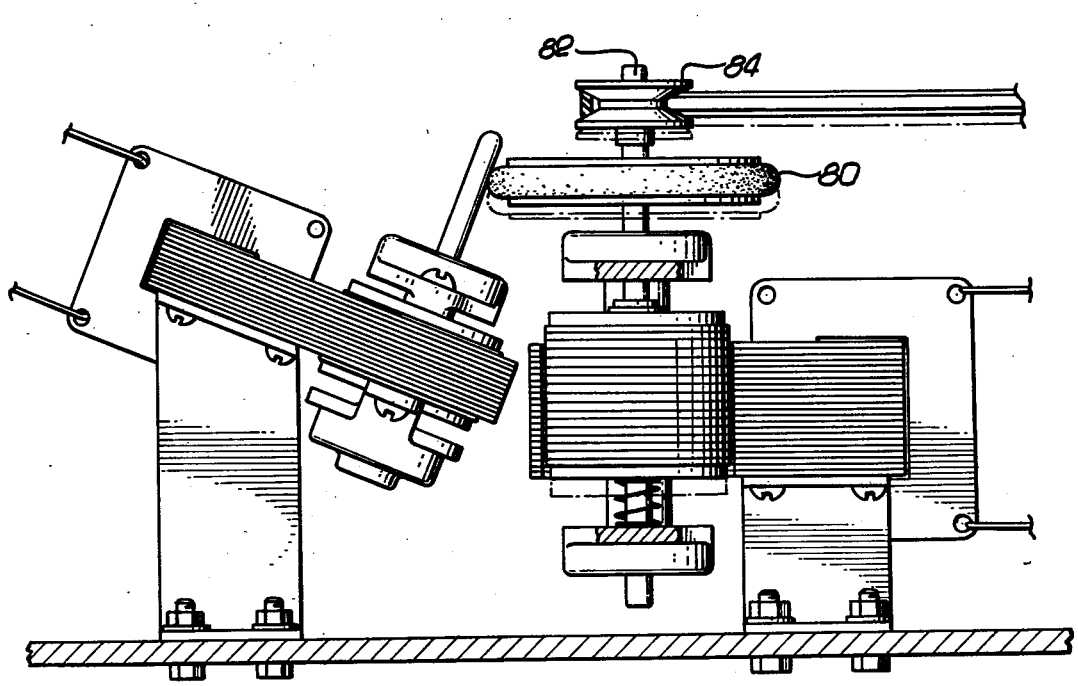
FIGS. 6 and 7 are diagrammatic illustrations of modified forms of the present invention.

In the form of the invention illustrated in FIG. 6, the friction member 80 is attached to the same extended end of the main motor shaft 82 as is the driving pulley 84. A slightly different mounting of the motors is thus provided. The operation is the same.

DESCRIPTION OF SECOND ALTERNATIVE FORM

Figure 7:
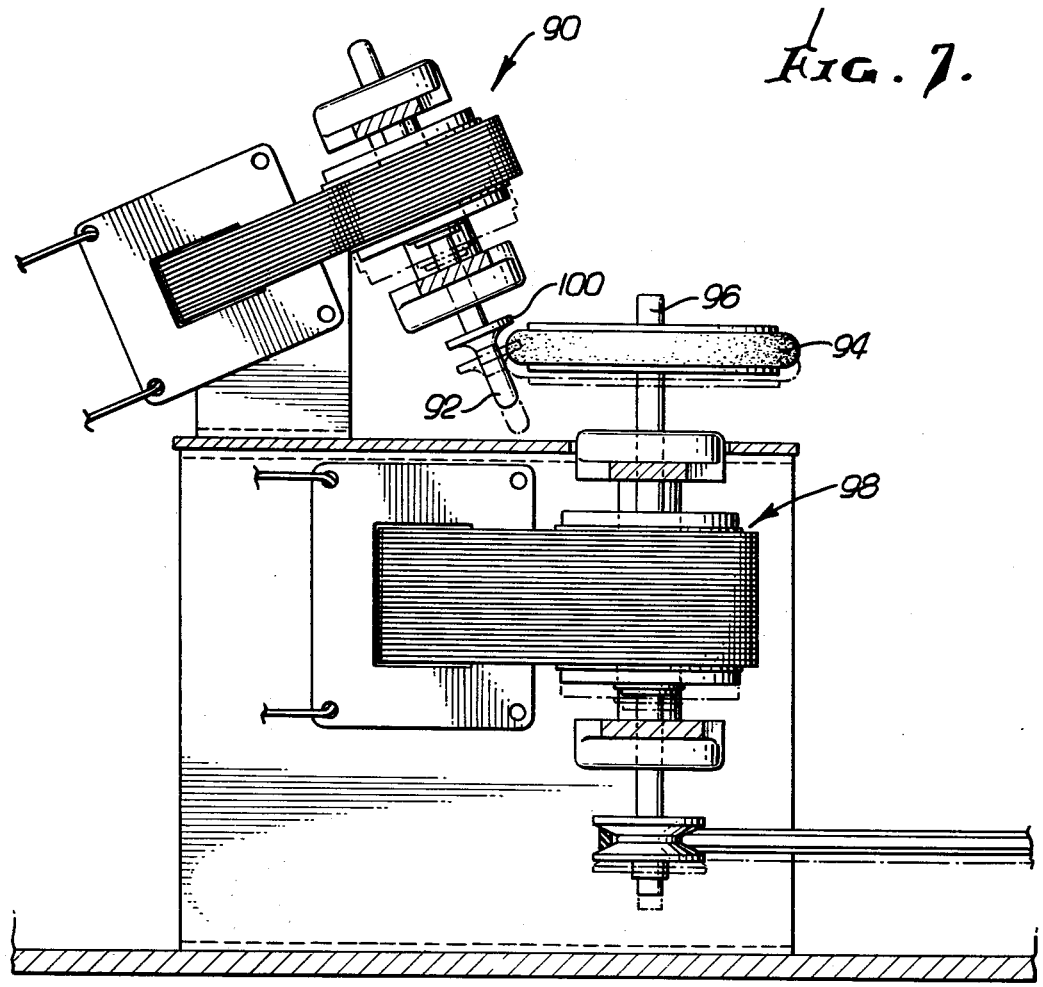

In the form of the invention illustrated in FIG. 7, the secondary motor 90 has a shaft or snubbing member 92, the free end of which projects radially into the orbit of the friction member 94. Solenoid action of the main motor 98 frees the friction member from the snubbing member or shaft 96. In the present instance, the snubbing member or shaft 92 has its axis located inclined to, but not skew to, the axis of the main motor shaft 96. To provide increased braking, the snubbing shaft 92 carries a small friction plate 100. The snubbing shaft 92 in the present instance is axially movable by solenoid action of the supplemental motor 90. Solenoid action retracts the brake plate out of the path of movement of the friction member 94 while solenoid action of the main motor 98 moves the friction member 94 away from wedging engagement of the snubbing shaft 92. When both motors are de-energized, braking occurs due to the combination of wedging with the shaft 92 and brake plate engagement as indicated in the phantom line position. The plate 100 is contoured to conform to the circular configuration of the friction member 94.

When the supplemental motor alone is energized, the brake plate 100 is retracted, while a driving engagement is provided between the shaft 92 and the friction member 94. Slow speed or chorus operation of the pulsato rotor results. The circuits shown in FIGS. 4 and 5 may be used for the system shown in FIG. 7 as desired.

Intending to claim all novel, useful and unobvious features shown or described, I make the following claims:

1. In apparatus for superimposing acoustic effects upon sound:
   (a) a pulsato rotor supported for rotation about its axis;
   (b) a pair of drive motors;
   (c) means supporting the drive motors so that their shafts are non-parallel;
   (d) transmission means between one of said motors and said pulsato rotor for operating said pulsato rotor at pulsato speed upon energization of said one motor;
   (e) said one of said motors having a floating rotor axially movable to a running position upon energization thereof, and biased to retract from said position;
   (f) means forming a releasable wedging coupling between said motor shafts operative upon de-energization of said one of said motors for braking said one motor; and
   (g) selective energization circuits for said motors for driving said pulsato rotor at chorus or pulsato speeds.

2. The combination as set forth in claim 1 in which said wedging coupling comprises two parts, one being the shaft of the other motor, the second part being an annular member carried by the shaft of the said one motor, said parts being movable into and out of wedging engagement with each other in accordance with the energization of said motors.

3. The combination as set forth in claim 2 in which a friction element is attached to one of said parts.

4. The combination as set forth in claim 3 in which said shaft axes are skew to each other so that said annular member contacts said shaft of said other motor along a line extending helically in a direction to cause the annular member to draw into increased wedging relationship with said other motor shaft upon overrunning movement therebetween.

5. The combination as set forth in claim 4 in which said energization circuits are arranged to cause both motors to run at least during an initial period following energization of said main motor to provide increased starting torque.

6. The combination as set forth in claim 1 in which said transmission means includes a pulley belt capable of slippage by pulsato rotor inertia upon braking of said main motor.

7. The combination as set forth in claim 3 together with a brake plate carried by the shaft of said other motor, said other of said motors also having a floating rotor axially movable to a running position in which said brake plate is retracted and in which said pulsato rotor is driven at a reduced chorus speed by said other motor when said one motor is de-energized.

8. In apparatus for producing pulsato by the aid of a rotary device:
   (a) a main drive motor having a stator and an axially movable rotor assembly including first and second extended shafts, said rotor assembly being movable between alternate first and second positions of larger and smaller reluctance respectively, with respect to said stator and normally being in said first position and movable in the direction toward the first extended shaft upon energization of said main drive motor;
   (b) means including a pulley secured to the first extended shaft of said main drive motor and a belt engaging said pulley for coupling said main drive motor to said rotary device, said coupling means and said main drive motor being designed to operate said rotary device at a rate to impart pulsato;
   (c) a friction drive wheel secured to the second extended shaft of said main drive motor;
   (d) a secondary drive motor having a stator and a rotor assembly including an extended shaft;
   (e) means supporting said secondary drive motor relative to said main drive motor such that the extended shaft of said secondary drive motor engages said drive wheel when the rotor assembly of said main drive motor is in its first position and to be disengaged from said drive wheel when the rotor assembly of said main drive motor is in its second position, said secondary drive motor, its extended shaft and said drive wheel being designed to operate said rotary device when said secondary drive motor is energized and said main drive motor is de-energized at a small fraction of its pulsato speed to impart chorus; and
   (f) selectively operable energization circuit means for said main and secondary drive motors including a selector switch having successive switching positions corresponding, first, to energization of both the main and secondary drive motors, second, to energization of only said secondary drive motor, and third, to off.

9. Apparatus according to claim 8, wherein said secondary drive motor is supported relative to said main drive motor in a position such that the extended shaft of the secondary motor is out of parallelism with the shaft of the main drive motor by a predetermined angle and engages the periphery of said friction drive wheel when said main drive motor is de-energized.

10. Apparatus according to claim 9, wherein the rotor assemblies of said main and secondary drive motors, when energized, rotate in opposite directions.

11. Apparatus according to claim 10, wherein the shafts of said main and secondary drive motors are out of parallelism in a direction so as to increase the degree of engagement between the extended shaft of said secondary drive motor and the periphery of said drive wheel when said selector switch is switched to either its second or third switching position from its first position.

* * * * *